Nov. 20, 1928.
J. A. BROOKS
1,692,403
FLUID TIGHT PACKING
Filed Nov. 28, 1927
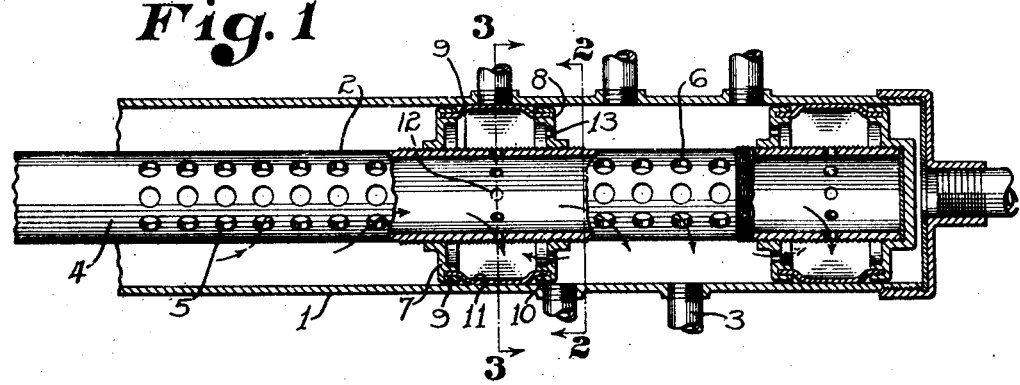
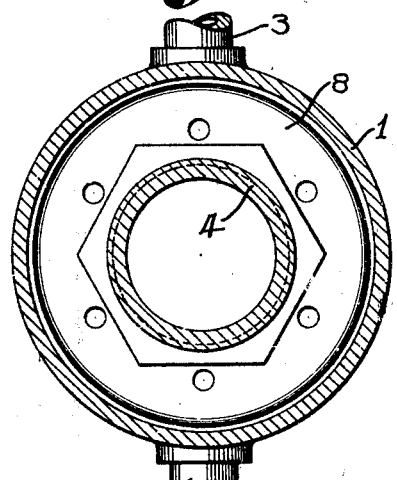
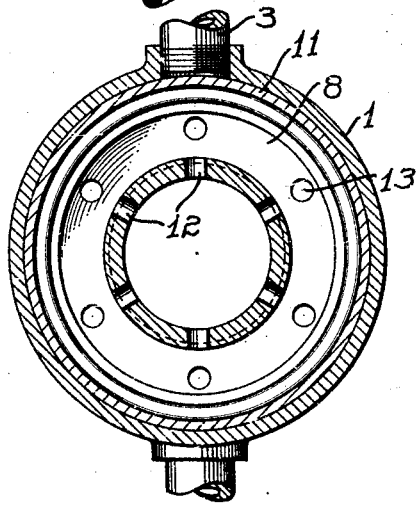
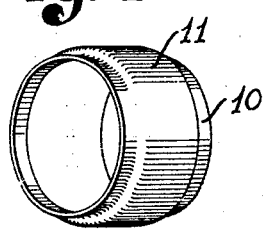
Inventor
John A. Brooks
By Owen & Owen
Attorneys Patented Nov. 20, 1928.

1,692,403

UNITED STATES PATENT OFFICE.

JOHN A. BROOKS, OF DETROIT, MICHIGAN.

FLUID-TIGHT PACKING.

Application filed November 28, 1927. Serial No. 236,079.

This invention relates to liquid-tight seals for relatively moving parts, but more particularly to packings especially adapted for use in automatic sprinkling systems of a known type.

An object of this invention is to provide a packing which is simple in construction, reliable in operation, and capable of being expanded against a relatively moving surface for satisfactorily maintaining an efficient liquid-tight connection over an extended period of time.

Another object of the invention is to provide a simple and efficient liquid-tight connection between a piston and cylinder so constructed and arranged that a reliable seal is effected irrespective of the irregularities in the internal wall of the cylinder.

Other objects and advantages will hereinafter appear.

The invention is shown by way of illustration in the accompanying drawings, in which:

Fig. 1 is a longitudinal sectional elevation of a cylinder and piston for an automatic sprinkling system showing my improved liquid-tight seal; Fig. 2 is a transverse section on the line 2—2 of Fig. 1; Fig. 3 is a section on the line 3—3 of Fig. 1; and Fig. 4 is a perspective view of a packing element.

The illustrated embodiment of the invention comprises a cylinder 1 in which a piston 2 is movable. Leading from selected points in the wall of the cylinder 1 are outlet conduits 3, which may extend to suitable places where spraying is desired. The piston 2 consists of a hollow stem 4 provided with a perforated portion 5 constituting the fluid inlet to the stem and a perforated portion 6 constituting the fluid outlet for the stem.

It is to be understood that liquid is supplied to the cylinder in any suitable manner and passes into the bore of the stem through the series of perforations 5 and from the stem through the series of perforations 6 to the outlet conduits 3. At opposite ends of the series of perforations 6 are packing devices to prevent escape of liquid along the stem, it being understood that the piston 4 reciprocates in the cylinder 1 and successively uncovers and covers the various outlet conduits 3, which as shown, are arranged in staggered relation.

Each packing unit consists of a pair of retainer rings 7 and 8 screwed onto a threaded portion 9 of the stem 4 and spaced longitudinally from each other. The retainer rings 7 and 8 are annular and of a diameter slightly less than the diameter of the cylinder 1. Formed in the retainer rings 7 and 8 are oppositely disposed recesses 9 and 10, respectively, and positioned within the recesses are end portions 10 of reduced diameter of a one piece flexible packing annulus 11.

The packing annulus may be of leather or other suitable material, and the central portion thereof is substantially flush with the periphery of the retainer rings 7 and 8, and extend slightly therebeyond into engagement with the wall of the cylinder 1. It will be noted that the reduced end portions 10 gradually merge into the intermediate portion to provide a gradually curved surface more easily to pass over irregularities in the cylinder wall, especially those formed by the openings for the conduits 3.

A portion of the pressure fluid passing through the stem 4 is introduced into the packing annulus 11 through an annular row of openings 12. It is apparent that pressure fluid passing through the perforations 12 impinges against the inside of the packing annulus 11 and forces the same outward against the cylinder walls, the connection between the end portions 10 and retainer rings being such that expansion of the packing annulus is permitted. Although the ends of the packing may be securely clamped or gripped by the retainer member, in the form shown the ends of the annulus are disposed loosely within the recesses of the retainer rings.

To insure that sufficient pressure fluid is supplied to the packing annulus 11 to maintain it expanded against the cylinder walls, the outer retainer ring 8 is provided with a series of openings 13 so that a portion of the pressure fluid passing from the series of perforations 6 may enter the chamber formed by the retainer rings and annulus. In this manner the annulus is forced outwardly into intimate contact with the cylinder walls immediately upon the admission of pressure fluid to the bore of the stem 4. The packing unit at the opposite end of the perforations 6 is similar to that above described, and further description thereof is deemed unnecessary.

From the above description it is manifest that, in accordance with my invention a liquid sealing unit or device is produced which effectively maintains a seal between relatively moving parts, and as there are no sharp corners or ends of the packing engageable with irregularities such as the edges of openings in the cylinder wall, the wearing qualities of the packing are greatly enhanced and the life of the packing materially extended.

It is obvious that this invention is not limited to the disclosure herein shown and described, but its application is of much broader scope and is adapted to be used in connection with any relatively moving parts where an efficient fluid tight seal or packing is desired. The above description is therefore to be considered as illustrative and not as limiting, and numerous changes in details of construction and arrangement may be effected without departing from the spirit of the invention, especially as defined in the appended claims.

What I claim as new and desire to secure by Letters Patent is:

1. In a device of the class described, a tubular stem having a fluid inlet and outlet in spaced relation, a packing unit on each side of said outlet, each unit comprising longitudinally spaced retainer members and a flexible annulus with the ends thereof engaged by said retainer members, said stem having means to supply fluid to the inside of the annuli for exerting an expanding force thereagainst.

2. In a device of the class described, a stem having a bore provided with a perforated portion to permit the passage of fluid under pressure therethrough, a packing member surrounding said stem and consisting of a one-piece flexible annulus, inner and outer retainer members on opposite sides of said perforated portion provided with means to loosely retain said annulus, said annulus having end portions of reduced diameter to permit the intermediate part thereof to lie approximately flush with the periphery of said retainer members and the outer retainer member having openings to permit the passage of pressure fluid to said annulus, said stem having an outlet adjacent said retainer members.

In testimony whereof I have hereunto signed my name to this specification.

JOHN A. BROOKS.